United States Patent
Baba et al.

(10) Patent No.: US 6,433,778 B1
(45) Date of Patent: Aug. 13, 2002

(54) FINGER OPERATING APPARATUS, AND ARM OPERATING APPARATUS USING THE FINGER OPERATING APPARATUS

(75) Inventors: Katsuyuki Baba; Shigeaki Ino; Yoichi Takamoto, all of Fukuoka-ken (JP)

(73) Assignee: TMSUK Co., Ltd., Fukuoka-ken (JP)

( * ) Notice: Subject to any disclaimer, the term of this patent is extended or adjusted under 35 U.S.C. 154(b) by 154 days.

(21) Appl. No.: 09/642,687

(22) Filed: Aug. 22, 2000

(30) Foreign Application Priority Data

Oct. 26, 1999 (JP) ............................................. 11-304558

(51) Int. Cl.⁷ ............................ G09G 5/08; G05G 9/00; H01C 10/16
(52) U.S. Cl. .................... 345/161; 74/471 XY; 338/128
(58) Field of Search ............................ 345/161; 74/469, 74/471 XY, 479.01, 481, 490.01; 414/1, 2, 4, 5, 7; 341/20; 338/128; 463/38; 273/148 B

(56) References Cited

U.S. PATENT DOCUMENTS

| | | | |
|---|---|---|---|
| 3,923,166 A | * 12/1975 | Fletcher et al. | 414/4 |
| 4,216,467 A | * 8/1980 | Colston | 341/20 |
| 4,332,177 A | * 6/1982 | Andresen | 74/471 XY |
| 4,620,176 A | * 10/1986 | Hayes | 338/128 |
| 4,857,881 A | * 8/1989 | Hayes | 338/128 |
| 4,947,701 A | * 8/1990 | Hegg | 74/471 XY |
| 5,142,931 A | * 9/1992 | Memahem | 74/471 XY |
| 5,228,356 A | * 7/1993 | Chuang | 74/471 XY |
| 5,436,640 A | * 7/1995 | Reeves | 345/161 |
| 5,473,325 A | * 12/1995 | McAlindon | 341/20 |
| 5,790,101 A | * 8/1998 | Schoch et al. | 345/161 |
| 6,178,841 B1 | * 1/2001 | Ruckert et al. | 74/471 XY |
| 6,354,945 B1 | * 3/2002 | Furuki et al. | 463/38 |

FOREIGN PATENT DOCUMENTS

JP 6-3465 1/1994 ............ G12B/1/00

* cited by examiner

*Primary Examiner*—Steven Saras
*Assistant Examiner*—Paul A. Bell
(74) *Attorney, Agent, or Firm*—Sughrue Mion, PLLC

(57) ABSTRACT

The invention is to provide a finger operating apparatus by which operations of a robot apparatus can be easily carried out comfortably, wherein the finger operating joystick includes a joystick shaft 11 rotatably attached to the signal reaction generator 2; a roughly cylindrical body 12 attached onto the upper part of the joystick shaft; a tongue-shaped thumb flexing instruction portion 13, which rotatably attached to the side of the cylinder body; a rectangular projection forefinger flexing instruction portion 14, which attached at the front upper part of the cylindrical body so as to freely advance and retreat; and a rectangular projection middle finger flexing instruction portion 15, attached at the front lower part of the cylindrical body so as to freely advance and retreat; and wherein the signal reaction generator includes the first, second and third detectors which detect movements of the first, second and third wires in line with rotation of the thumb flexing instruction portion, advance and retreat of the forefinger flexing instruction portion, and advance and retreat of the middle finger flexing instruction portion; and a wrist rotation detector which detects the rotation of the joystick shaft.

3 Claims, 5 Drawing Sheets

FINGER OPERATING APPARATUS, AND ARM OPERATING APPARATUS USING THE FINGER OPERATING APPARATUS

BACKGROUND OF THE INVENTION

1. Field of the Invention

The present invention relates to an finger operating apparatus which instructs flexing motions of fingers, and an arm operating apparatus which uses the same finger operating apparatus and instructs motions of the respective parts of an arm along with the flexing motions of fingers.

2. Description of the Prior Art

Recently, an operating apparatus (for example, a finger operating apparatus, and an arm operating apparatus including the finger operating apparatus) which provides motion instructions to a robot has been thought highly of, in line with an increase in work force by a robot apparatus.

As a prior art finger operating apparatus, an input device acting as a data glove disclosed in, for example, Japanese Laid-Open Patent Publication No. 3465 of 1994, exists. The data glove is to instruct flexing motions of fingers, utilizing variations in electrical resistance of an electrically conductive gel which is attached to joint portions of the fingers of a glove-shaped input device in response to the flexed condition of the fingers.

However, the data glove is of a glove type, in which electrically conductive gel must be attached to the joints of respective fingers as sensors. Therefore, attaching and detaching thereof is very cumbersome, and there arises another problem in that operators feel uncomfortable since the fingers will perspire in the gloves when temperature is high.

In the finger operating joystick and arm operating apparatus, it is requested that the operation is easily and comfortably carried out.

To meet this request, it is therefore an object of the invention to provide a finger operating apparatus whose operation can be easily and comfortably carried out, and an arm operating apparatus whose operation is also simply carried out by using the same finger operating apparatus.

SUMMARY OF THE INVENTION

In order to achieve the abovementioned object, according to the invention a finger operating apparatus comprises a finger operating joystick, a signal reaction generator at which one end of the first, second and third return springs are anchored, and the first, second and third wires, one end of each is anchored at the finger operating joystick, and the other end of which is anchored at the other end of the first, second and third return springs of the signal reaction generator; wherein the finger operating joystick includes a joystick shaft rotatably attached to the signal reaction generator; a roughly cylindrical body attached onto the upper part of the joystick shaft; a tongue-shaped thumb flexing instruction portion, to which one end of the first wire is attached, rotatably attached to the side of the cylindrical body by pressing of the first return spring; a rectangular projection forefinger flexing instruction portion, to which one end of the second wire is attached, attached at the front upper part of the cylindrical body by pressing of the second return spring so as to freely advance and retreat; and a rectangular projection middle finger flexing instruction portion, to which one end of the third wire is attached, attached at the front lower part of the cylindrical body by pressing of the third return spring so as to freely advance and retreat; and wherein the signal reaction generator includes the first, second and third detectors which detect movements of the first, second and third wires in line with rotation of the thumb flexing instruction portion, advance and retreat of the forefinger flexing instruction portion, and advance and retreat of the middle finger flexing instruction portion; and a wrist rotation detector which detects the rotation of the joystick shaft.

Accordingly, it is possible to obtain a finger operating apparatus whose operation can be easily and comfortably carried out. Also, the fingers of a robot can be operated incorporated with the fingers of an operator, wherein delicate finger operations of the operator can be realized by the fingers of the robot.

An arm operating apparatus according to the invention to achieve the abovementioned object comprises an arm forward/backward motion instruction device for instructing the forward or backward motion of the arm; an arm right/left motion instruction device for instructing the right or left motion of the arm; an upper arm rotation instruction device for instructing the rotation of the upper arm; an elbow flexing instruction device for instructing the flexing motion of the elbow; a forearm rotation instruction device for instructing the rotation of the forearm; and a wrist up/down motion instruction device for instructing the up or down motion of the wrist; wherein a signal reaction generator of the finger operating apparatus as set forth in Claim 1 or 2 is fixed at the wrist up/down motion instruction device.

Therefore, an arm operating apparatus which is capable of simply carrying out operations by using the abovementioned finger operating apparatus can be obtained. Since motions of the entire arm from the portions adjacent to the shoulder of the arm of a robot apparatus to the fingertip can be achieved by an operator being seated in, for example, a chair and moving his or her arm with the finger operating apparatus grasped in his or her hand. Therefore, it is possible to easily carry out instruction of the arm motions of the robot apparatus comfortably.

As described above, according to the finger operating apparatus as set forth in Claim 1 of the invention, a finger operating apparatus comprises a finger operating joystick, a signal reaction generator at which one end of the first, second and third return spring is anchored, and the first, second and third wires, one end of each is anchored at the finger operating joystick, and the other end of which is anchored at the other end of the first, second and third return springs of the signal reaction generator; wherein the finger operating joystick includes a joystick shaft rotatably attached to the signal reaction generator; a roughly cylindrical body attached onto the upper part of the joystick shaft; a tongue-shaped thumb flexing instruction portion, to which one end of the first wire is attached, rotatably attached to the side of the cylindrical body by pressing of the first return spring; a rectangular projection forefinger flexing instruction portion, to which one end of the second wire is attached, attached at the front upper part of the cylindrical body by pressing of the second return spring so as to freely advance and retreat; and a rectangular projection middle finger flexing instruction portion, to which one end of the third wire is attached, attached at the front lower part of the cylindrical body by pressing of the third return spring so as to freely advance and retreat; and wherein the signal reaction generator includes the first, second and third detectors which detect movements of the first, second and third wires in line with rotation of the thumb flexing instruction portion, advance and retreat of the forefinger flexing instruction portion, and advance and retreat of the middle finger flexing instruction portion; and a wrist rotation detector which detects the rotation of the joystick shaft. Therefore, the thumb flexing instruction portion is disposed at the side of the cylindrical body, and the forefinger flexing instruction portion and the middle finger flexing instruction portion are disposed at the front side of the cylindrical body, whereby if the cylindrical body is grasped by a hand so as to cover it, it is possible to easily provide a robot apparatus with instructions of the thumb, forefinger, middle finger flexing actions (the flexing actions of the third finger and little finger are included in the middle finger flexing action) without accompanying any sense of discomfort as in the data glove. At the same time, by rotating the thumb flexing instruction portion disposed at the front side of the cylindrical body by the thumb, a signal to instruct flexing to the thumb can be generated from the first detector, and by causing the forefinger flexing instruction portion and middle finger flexing instruction portion, which are disposed at the side of the cylindrical body, to advance and retreat, both a signal to instruct flexing to the forefinger and a signal to instruct flexing to the middle finger can be generated from the second and third detectors. Further, by means of an operator rotating the joystick shaft 11, a signal to instruct rotation of the wrist can be generated by the wrist rotation detector 212. That is, an advantageous effect can be brought about, by which delicate and accurate operation can be achieved.

According to the finger operating apparatus of Claim 2, in addition to the finger operating apparatus as set forth in Claim 1, the signal reaction generator is provided with a reaction generator, which controls the movement of the first, second and third wires by a braking force responsive to a voltage applied between the other end of the first, second and third return springs and the other end of the first, second and third wires. Therefore, since it is possible to control the braking force by controlling the applied voltage, it is also possible to control the reaction generated at the first, second and third wire on the basis of the reaction in the robot apparatus, wherein an advantageous effect can be brought about, by which delicate and accurate operation can be achieved.

According to the arm operating apparatus of Claim 3, an arm operating apparatus is provided with an arm operating apparatus attaching portion by which the arm operating apparatus is fixed at a fixing portion such as a chair, etc.; an arm forward/backward motion instruction device for instructing the forward or backward motion of the arm; an arm right/left motion instruction device for instructing the right or left motion of the arm; an upper arm rotation instruction device for instructing the rotation of the upper arm; an elbow flexing instruction device for instructing the flexing motion of the elbow; a forearm rotation instruction device for instructing the rotation of the forearm; and a wrist up/down motion instruction device for instructing the up or down motion of the wrist; wherein a signal reaction generator of the finger operating apparatus as set forth in Claim 1 or 2 is fixed at the wrist supporting member incorporating the wrist up/down motion instruction device. Therefore, various motions of the entire arm from the portions adjacent to the shoulder of the arm of the robot apparatus to the fingertips can be achieved by an operator being seated in, for example, a chair and moving his or her arm with the finger operating apparatus grasped in his or her hand. Accordingly, such an advantageous effect can be brought about, wherein arm motion instruction of the robot apparatus can be easily carried out comfortably. Also, integrity of the operations made by an operator and motions of the robot apparatus can be further improved, wherein delicate and accurate operations of the robot apparatus can be remarkably improved.

DESCRIPTION OF THE DRAWINGS

The foregoing and other features and advantages of the present invention will become more readily more appreciated as the same becomes better understood by reference to the following detailed description when taken into conjunction with the accompanying drawings wherein.

DESCRIPTION OF THE PREFERRED EMBODIMENTS

Figure 1:
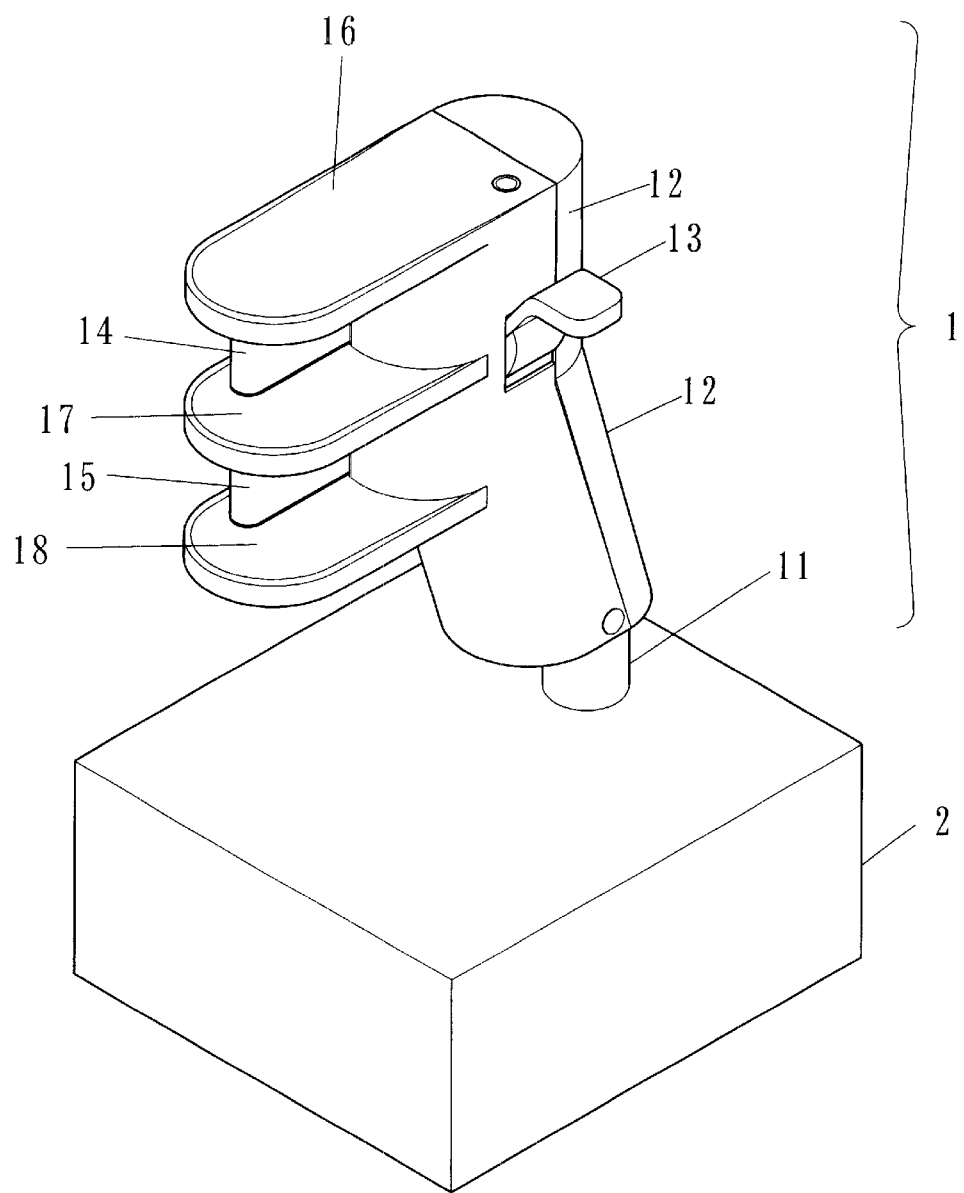
FIG. 1 is a perspective view of a finger operating apparatus according to the first embodiment of the invention.

A finger operating apparatus according to Claim 1 of the invention is constructed so that it comprises a finger operating joystick, a signal reaction generator at which one end of the first, second and third return springs is anchored, and the first, second and third wires, one end of each is anchored at the finger operating joystick, and the other end of which is anchored at the other end of the first, second and third return springs of the signal reaction generator; wherein the finger operating joystick includes a joystick shaft rotatably attached to the signal reaction generator; a roughly cylindrical body attached onto the upper part of the joystick shaft; a tongue-shaped thumb flexing instruction portion, to which one end of the first wire is attached, rotatably attached to the side of cylindrical body by pressing of the first return spring; a rectangular projection forefinger flexing instruction portion, to which one end of the second wire is attached, attached at the front upper part of the cylindrical body by pressing of the second return spring so as to freely advance and retreat; and a rectangular projection middle finger flexing instruction portion, to which one end of the third wire is attached, attached at the front lower part of the cylindrical body by pressing of the third return spring so as to freely advance and retreat; and wherein the signal reaction generator includes the first, second and third detectors which detect movements of the first, second and third wires in line with rotation of the thumb flexing instruction portion, advance and retreat of the forefinger flexing instruction portion, and advance and retreat of the middle finger flexing instruction portion; and a wrist rotation detector which detects the rotation of the joystick shaft.

With the construction, the following actions can be carried out, that is, thumb flexing is instructed by rotating the thumb flexing instruction portion disposed at the front side of the cylindrical body by the thumb, and forefinger flexing and middle finger flexing are instructed by causing the forefinger flexing instruction portion and the middle finger flexing instruction portion, which are disposed at the side of the cylindrical body, to advance and retreat.

A finger operating apparatus as described in Claim 2, in addition to the finger operating apparatus as set forth in Claim 1, is such that the signal reaction generator is provided with a reaction generator, which controls the movement of the first, second and third wires by a braking force responsive to a voltage applied between the other end of the first, second and third return springs and the other end of the first, second and third wires.

With the construction, the braking force is controlled by controlling the applied voltage, and such an action can be brought about, by which the reaction generated at the first, second and third wires can be controlled.

An arm operating apparatus according to Claim 3 is constructed so that the arm operating apparatus comprises an arm operating apparatus attaching portion by which the arm operating apparatus is fixed to a fixing portion such as a chair, etc.; an arm forward/backward motion instruction device for instructing the forward or backward motion of the arm; an arm right/left motion instruction device for instructing the right or left motion of the arm; an upper arm rotation instruction device for instructing the rotation of the upper arm; an elbow flexing instruction device for instructing the flexing motion of the elbow; a forearm rotation instruction device for instructing the rotation of the forearm; and a wrist up/down motion instruction device for instructing the up or down motion of the wrist; wherein a signal reaction generator of the finger operating apparatus as set forth in Claim 1 or 2 is fixed at the wrist supporting member incorporating the wrist up/down motion instruction device.

With the construction, such an action can be brought about, by which an apparatus enabling the instruction of movements of the entire arm from the portions adjacent to the shoulder of the arm to the fingertip can be achieved. Since motions of the entire arm from the portions adjacent to the shoulder of the arm of a robot apparatus to the fingertip can be achieved by an operator being seated in, for example, a chair and moving his or her arm with the finger operating apparatus grasped in his or her hand. Therefore, it is possible to easily carry out instruction of the arm motions of the robot apparatus comfortably.

Hereinafter, a description is given of embodiments of the invention with reference to FIG. 1 through FIG. 4.

(Embodiment 1)

FIG. 1 is a perspective view showing a finger operating apparatus according to the first embodiment of the invention.

In FIG. 1, 1 is a finger operating joystick in the first embodiment. 2 is a signal reaction generator. 11 is a joystick shaft rotatably attached to the signal reaction generator 2/12 is a roughly cylindrical body attached to the upper part of the joystick shaft 11. 13 is a tongue-shaped thumb flexing instruction portion rotatably attached to the side of the cylindrical body 12. 14 is a forefinger flexing instruction portion which is attached to the front upper part of the cylindrical body 12 so as to freely advance and retreat and is composed of a lever made as a rectangular projection. 15 is a middle finger flexing instruction portion which is attached at the front lower part of the cylindrical body 12 so as to freely advance and retreat and is composed of a lever made as a rectangular projection. 16, 17 and 18 are guide members which guide the advance and retreat of the forefinger flexing instruction portion 14, and middle finger flexing instruction portion 15.

Figure 2:
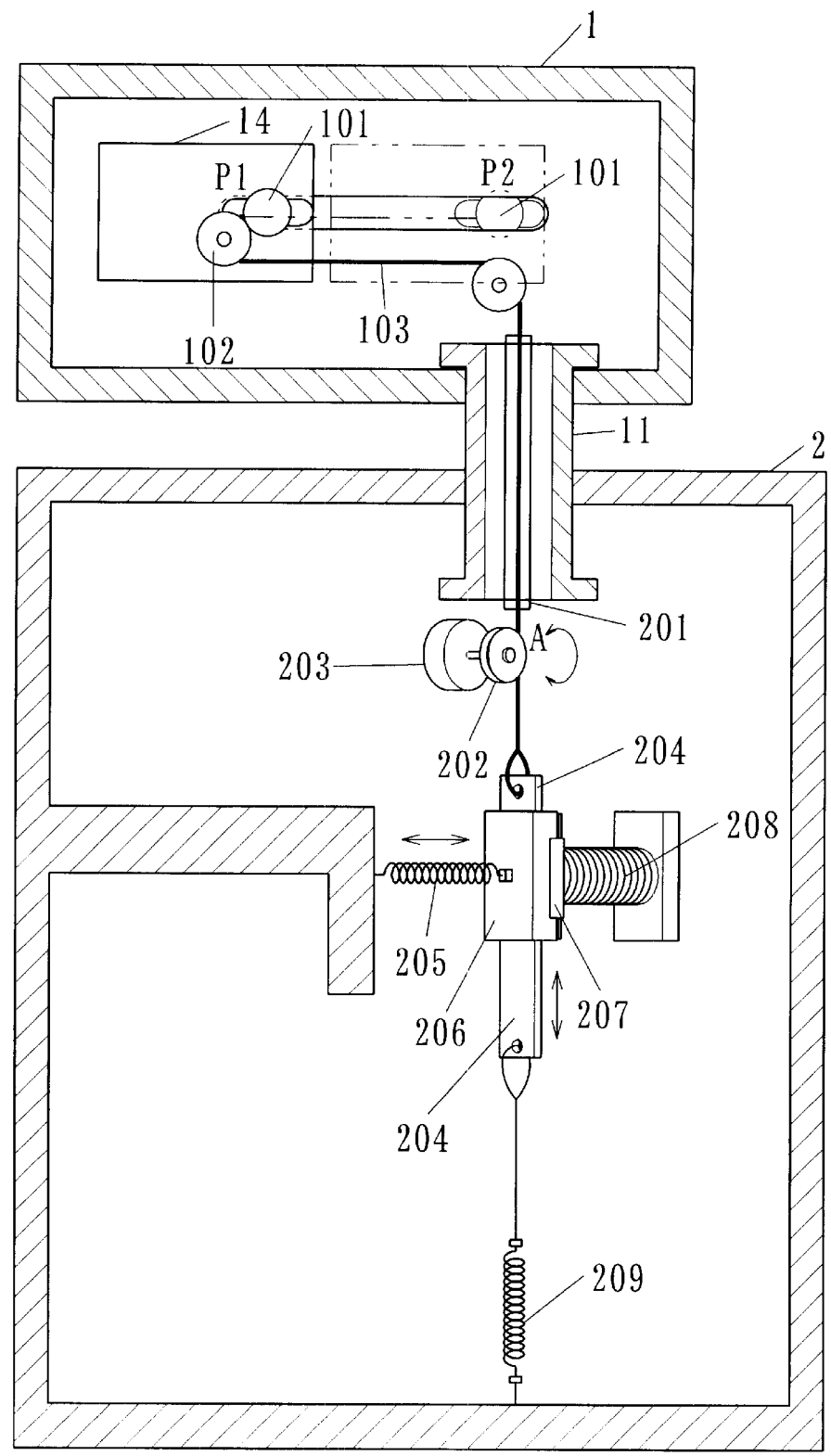
FIG. 2 is a view showing the mechanism of the finger operating apparatus in FIG. 1.

FIG. 2 is a configurational view showing the mechanism of a finger operating apparatus shown in FIG. 1, which shows only one system among the three systems of the thumb, forefinger and middle finger (herein, only the forefinger system is illustrated). The other systems are identical in structure to the forefinger system.

In FIG. 2, 1 is a finger operating joystick, 2 is a signal reaction generator, 11 is a joystick shaft, and 14 is a forefinger flexing instruction portion. These components are similar to those in FIG. 1, and they are given the same reference numbers, whereby overlapping description thereof is omitted.

101 is a moving pulley which moves right and left in a range from position P1 to position P2 in response to movements of the forefinger flexing instruction portion 14. 102 is a fixed pulley. 103 is a wire, one end of which is fixed at the moving pulley 101, and the other end of which is fixed at a plate-like formed friction plate 204 made of a magnetic body. 201 is a flexible tube composed of a flexible synthetic resin tube or a metallic bellow tube, etc., into which the wire 103 is inserted. 202 is a pulley on which the wire 103 is wound one time or more. 203 is a potentiometer which turns and moves along with the pulley 202. 205 is a spring, one end of which is fixed, and the other end of which is anchored at a nipping plate 206. 207 is a pressing plate fixed at the electromagnet 208. The nipping plate 206 is attracted by the pressing plate 207 in response to the amount of a current of the plate-like formed electromagnet 208 composed of a magnetic body such as an iron piece, etc. 209 is a return spring, one end of which is anchored at the fixing part of the signal reaction generator 2. Herein, there are three systems of the wires 103 and return springs 209. The thumb, forefinger and middle finger wires and return springs are, respectively, called the first, second and third wires and return springs. Therefore, the wire 103 and return spring 209 illustrated in FIG. 2 are the second wire and second return spring.

Accordingly, a description is given, as a representative example, of actions for generating a flexing instruction signal in the forefinger, and a reaction applying action in the forefinger, with reference to FIG. 1 and FIG. 2.

By pressing the forefinger flexing instruction portion 14 by using the forefinger, the forefinger flexing instruction portion 14 moves right toward the position P2 in FIG. 2. In line there with, the wire 103 moves upward in the joy stick shaft 11, and the pulley 202 turns left in the direction of the arrow A (in the case where the wire 103 coming from upward is wound on the pulley 202 in the right winding direction), whereby the potentiometer 203 also rotates left. Thereby, the resistance value of the potentiometer 203 becomes a value responsive to the moving distance of the wire 103, that is, the amount of movement of the moving pulley 101 (the degree of pressing of the forefinger flexing instruction portion 14), and if an appointed voltage is applied to the potentiometer 203, a flexing instruction signal of the voltage value responsive to the amount of movement of the moving pulley 101 can be generated.

Next, a description is given of a reaction applying action.

The reaction applying action is to provide the finger of the finger operating apparatus with a reaction force similar to the reaction (a force to grasp an object) which is generated by a gripping motion in a robot apparatus (not illustrated) operating on the basis of a flexing instruction signal from the finger operating apparatus and is applied to the finger. As a current, based on a reaction signal showing the finger reaction value, flows from the robot apparatus to the electromagnet 208, the nipping plate 206 advances, and presses the friction plate 204 along with the pressing plate 207, whereby the friction plate 204 is intensively nipped therebetween. The pressing force is determined by the value of the current flowing to the electromagnet 208, that is, the reaction value expressed by the reaction signal, wherein as the pressing force is increased, it becomes more difficult for the wire 103 to move, and it also becomes more difficult for the forefinger flexing instruction portion 14 to move. Thus, a reaction responsive to the reaction value at the robot apparatus side can be generated at the finger operating apparatus. That is, by controlling the current flowing in the electromagnet 208 with the reaction signal, it is possible to regenerate the reaction at the robot apparatus at the finger operating apparatus side. Also, the potentiometer 203 is a potentiometer (the second potentiometer, the second detector) for the forefinger. As described, there are potentiometers for the thumb and middle finger (that is, the first and third potentiometers, the first and third detectors).

Figure 3:
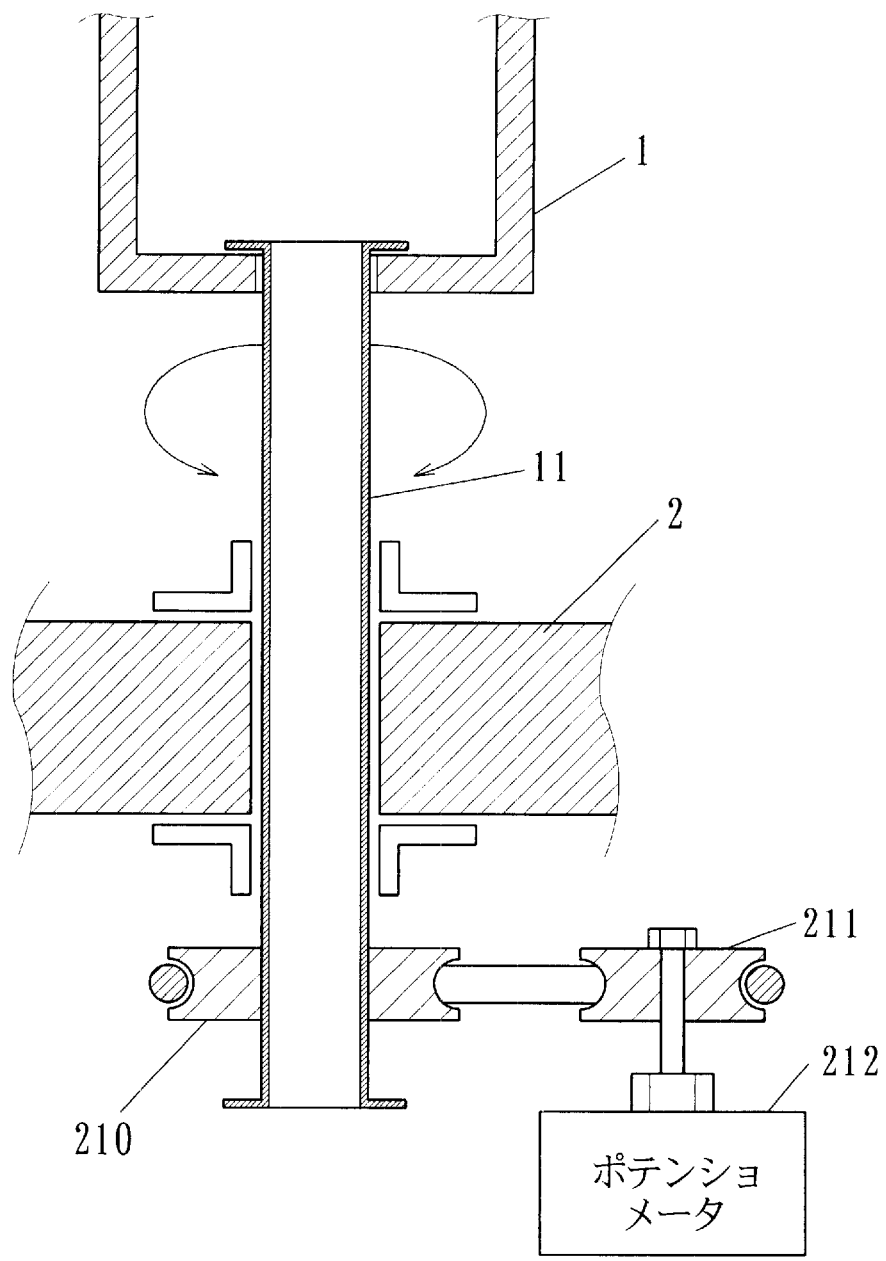
FIG. 3 is a view showing the mechanism of a wrist rotation detector.

Next, a description is given of a wrist rotation detector, using FIG. 3. FIG. 3 is a view showing the mechanism of the wrist rotation detector.

In FIG. 3, 1 is a finger operating joystick, 2 is a signal reaction generator, and 11 is a joystick shaft, wherein since these components are similar to those in FIG. 1 and FIG. 2, the same reference numbers are given to them, and overlapping description thereof is omitted herein.

210 is a rotating pulley rotating along with the joystick shaft 11, 211 is a driven pulley rotated in line with the rotation of the rotating pulley 210. 211a is a belt for transmitting the degree of rotation of the rotating pulley 210 to the driven pulley 211. 212 is a potentiometer, acting as a wrist rotation detector, which rotates along with the driven pulley 211.

The joystick shaft 11 is fixed at the finger operating joystick 1, wherein if the joystick 1 rotates right and left, the joystick shaft 11 rotates along therewith. In line with the rotation thereof, a pulley 210, inserted into and fitted in the joystick shaft 11, is caused to rotate, and the driven pulley 211 which is coupled to the rotating pulley 210 by a belt is also caused to rotate. Further, a potentiometer 212 whose axis is coincident with the driven pulley 211, is also caused to rotate. Accordingly, the right and left rotation of the finger operating joystick 1, that is, the rotating angle of the shaft 11 can be detected by the potentiometer 212. If an appointed voltage is applied to the potentiometer 212, a wrist rotation instruction signal responsive to the rotating angle of the joystick shaft 11 is generated. Thus, it is possible to generate a signal which instructs the wrist rotational motion (right and left motions of the wrist) to a robot apparatus (not illustrated).

According to the preferred embodiment constructed as described above, the finger operating joystick 1 includes a joystick shaft 11 rotatably attached to the signal reaction generator 2; a roughly cylindrical body 12 attached onto the upper part of the joystick shaft 11; a tongue-shaped thumb flexing instruction portion 13, to which one end of the first wire is attached, rotatably attached to the side of the cylindrical body 12 by pressing of the first return spring; a rectangular projection forefinger flexing instruction portion 14, to which one end of the second wire 103 is attached, attached at the front upper part of the cylindrical body 12 by pressing of the second return spring 209 so as to freely advance and retreat; and a rectangular projection middle finger flexing instruction portion 15, to which one end of the third wire is attached, attached at the front lower part of the cylindrical body 12 by pressing of the third return spring so as to freely advance and retreat; and wherein the signal reaction generator 2 includes the first, second and third detectors which detect movements of the first, second and third wires in line with rotation of the thumb flexing instruction portion 13, advance and retreat of the forefinger flexing instruction portion 14, and advance and retreat of the middle finger flexing instruction portion 15; and a wrist rotation detector 212 which detects the rotation of the joystick shaft 11. Therefore, a thumb flexing instruction signal can be generated from the first detector by rotating the thumb flexing instruction portion 13 disposed at the front side of the cylindrical body 12 by using the thumb. A forefinger flexing instruction signal and a middle finger flexing instruction signal can be generated from the second and third detectors by causing the forefinger flexing instruction portion 14 and middle finger flexing instruction portion 15, which are disposed at the side of the cylindrical body 12, to advance and retreat. Further, a wrist rotation instruction signal can be generated from the wrist rotation detector 212 by rotating the joystick shaft 11, and at the same time, since the thumb flexing instruction portion 13 is disposed at the side of the cylindrical portion 12, and the forefinger flexing instruction portion 14 and the middle finger flexing instruction portion 15 are disposed at the front side of the cylindrical body 12, it is possible to easily provide a robot apparatus with instructions for the thumb, forefinger, middle finger flexing actions (the flexing actions of the third finger and little finger are included in the middle finger flexing action) by grasping the cylindrical portion 12 such that it is wrapped by an operators hand.

Also, since the signal reaction generator 2 is provided with reaction generators 204 through 208, which control the movement of the first, second and third wires by a braking force responsive to applied voltage, between the other end of the first, second and third return springs, and the other end of the first, second and third wires, the braking force can be controlled by controlling the applied voltage, whereby reaction forces generated at the first, second and third wires can be controlled.

(Embodiment 2)

Figure 4:
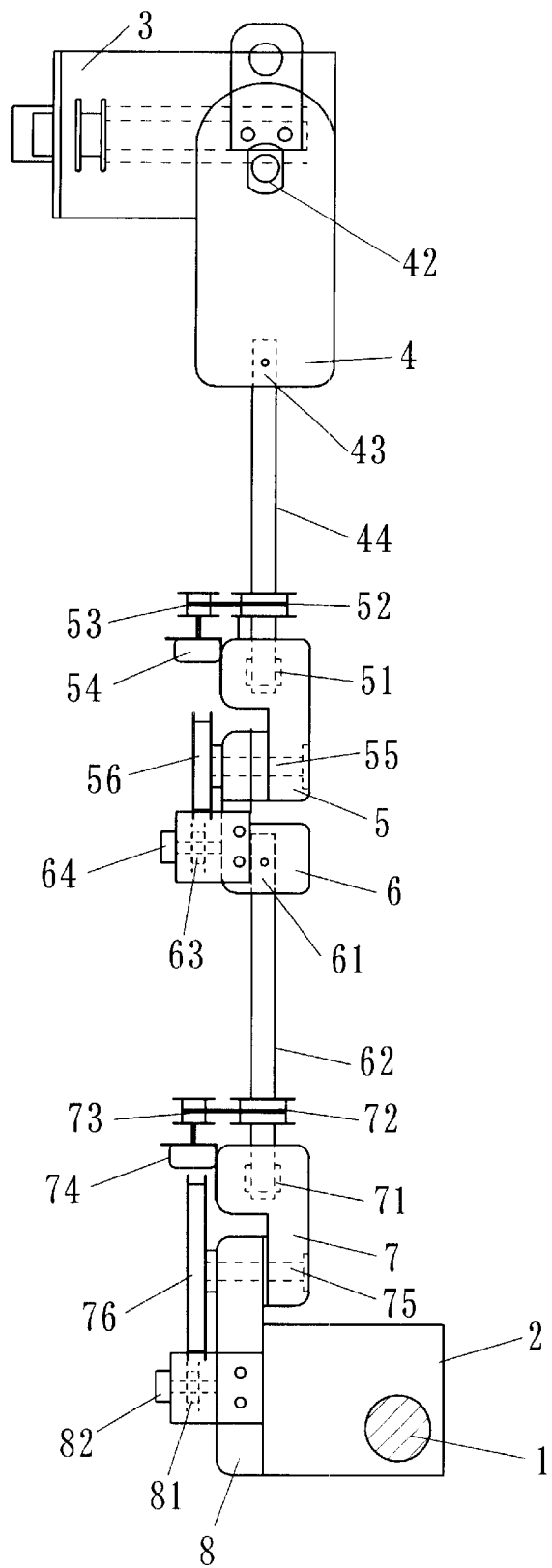
FIG. 4 is a front elevational view showing the mechanism of an arm operating apparatus according to the second embodiment of the invention.
Figure 5:
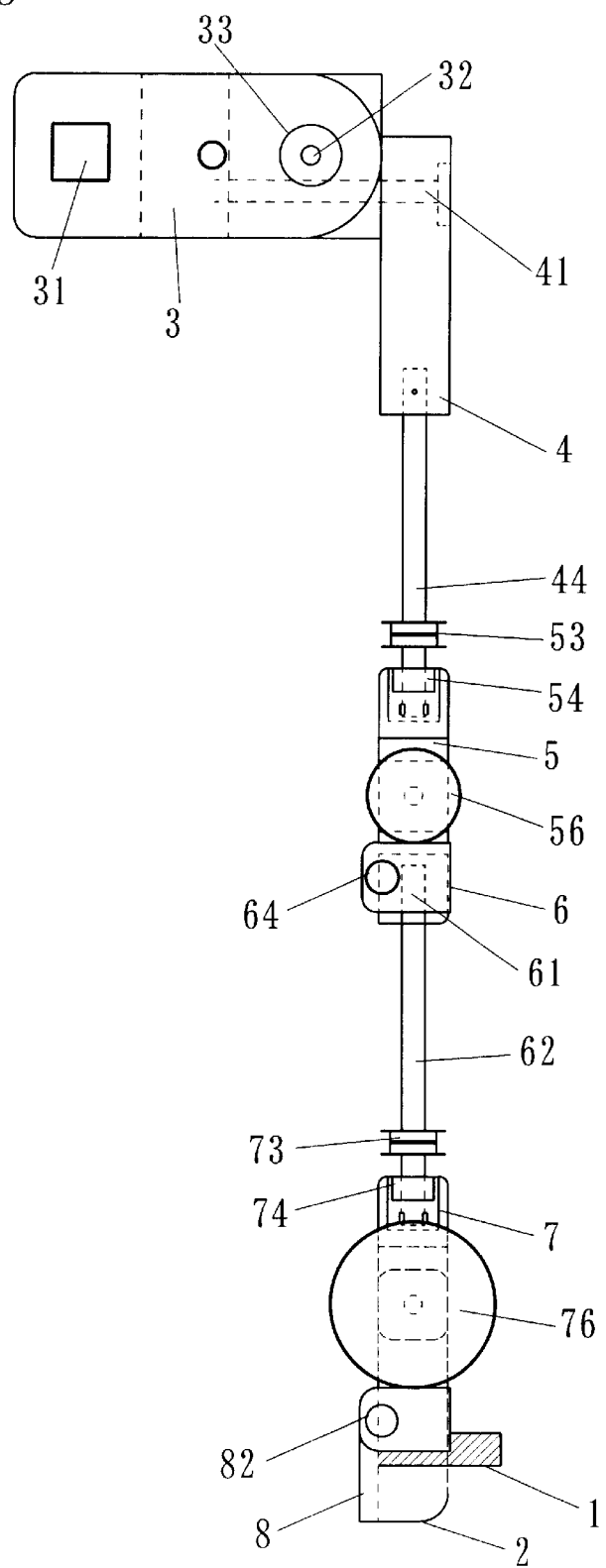
FIG. 5 is a side elevational view showing the mechanism of the arm operating apparatus according to the second embodiment of the invention.

FIG. 4 is a front elevational view showing the mechanism of an arm operating apparatus according to the second preferred embodiment of the invention. FIG. 5 is a side elevational view showing the mechanism of the arm operating apparatus according to the second preferred embodiment of the invention.

In FIG. 4 and FIG. 5, 1 is a finger operating joystick, and 2 is a signal reaction generator. These components are identical to those in the first embodiment, whereby they are given the same reference numbers and overlapping description is omitted.

3 is a shoulder supporting member, 4 is an upper arm supporting member, 5 is the first elbow supporting member, 6 is the second elbow supporting member, 7 is a forearm supporting member, 8 is a wrist supporting member, 31 is an arm operating apparatus attaching portion which is used to fix the arm operating apparatus in a chair, etc., 32 is an arm forward/backward rotation axis which is a rotation axis in the case where the arm is turned forward and backward, 33 is a potentiometer, acting as an arm forward/backward motion instruction device, which turns along with the arm forward/backward rotation axis 32, 41 is an arm right/left rotation axis which is a rotation axis when moving and rotating the arm right and left, 42 is a potentiometer, acting as an arm right/left motion instruction device, which turns along with the arm right/left rotation axis 41, 43 is an upper arm fixing portion where the upper arm portion 44 is fixed at the upper arm supporting member 4 by a pin or a screw, etc., 51 is a bearing portion by which the upper arm portion 44 is made rotatable with respect to the first elbow supporting member 5, 52 and 53 are pulleys which are connected by a belt, etc., and transmit the rotation of the upper arm portion 44 to the potentiometer 54 acting as an upper arm rotation instruction device, 55 is a bearing portion by which the second elbow supporting member 6 is made rotatable with respect to the first elbow supporting member 5, 56 is a pulley which rotates along with the axis of the bearing portion 55, 61 is a forearm fixing portion which fixes the forearm portion 62 on the second elbow supporting member 6 by a pin or a screw, etc., 63 is a pulley which transmits rotational motions (flexing motions) of the second elbow supporting member 6, 64 is a potentiometer which acts as an elbow flexing instruction device rotating in line with the rotational motions of the second elbow supporting member 6, which are transmitted from the pulley 63 via a belt of the pulley 56, etc., 71 is a bearing portion which makes the forearm portion 62 rotatable with respect to the forearm supporting member 7, 72 and 73 are pulleys that transmit the rotation of the forearm portion 62 to a potentiometer 74 acting as the forearm rotation instruction device. 75 is a bearing portion that makes the signal reaction generator 2 rotatable with respect to the forearm supporting member 7 and enables upward and downward motions of the wrist. 76 is a pulley that transmits rotational motions of the signal reaction generator 2. 81 is a pulley that transmits rotational motions (that is, upward and downward motions of the wrist) of the signal reaction generator 2, which are transmitted via the pulley 76, to the potentiometer 82 acting as a wrist up/down motion instruction device.

Also, FIG. 4 and FIG. 5 show a left arm operating apparatus to operate the left arm, and a right arm operating apparatus is symmetrical with respect to the left arm operating apparatus in FIG. 4 and FIG. 5. A pair of the right and left arm operating apparatuses give instructions to move the left arm and right arm of the robot apparatus.

In the arm operating apparatus (in detail, the left arm operating apparatus) thus constructed, the arm operating apparatus attaching portion 31 is placed on, for example, a chair, and an operator being seated in the chair grasps the finger operating joystick 1 by his or her hand (in FIG. 4 and FIG. 5, the left hand), and can give instructions to move the shoulder forward or backward, or leftward or rightward, to turn the upper arm, to move the elbow forward or backward, to turn the forearm, and to move the wrist upward or downward. That is, it is possible to generate a signal to instruct a forward or backward motion to the shoulder and a signal to instruct a leftward or rightward motion to the shoulder by the potentiometers 33 and 42, a signal to instruct an upper arm rotational motion by the potentiometer 54, a signal to instruct an upward or downward motion to the elbow by the potentiometer 63, a signal to instruct a rotational motion to the forearm by the potentiometer 74, and a signal to instruct an upward or downward motion to the wrist by the potentiometer 83. In addition, as described above, a signal to instruct a leftward or rightward motion to the wrist is generated by the potentiometer 212 of the signal reaction generator 2.

In the preferred embodiment as described above, an arm operating apparatus comprises an arm operating apparatus attaching portion 31 by which the arm operating apparatus is fixed at a fixing portion such as a chair, etc.; an arm forward/backward motion instruction device 33 for instructing the forward or backward motion of the arm; an arm right/left motion instruction device 42 for instructing the right or left motion of the arm; an upper arm rotation instruction device 54 for instructing the rotation of the upper arm; an elbow flexing instruction device 64 for instructing the flexing motion of the elbow; a forearm rotation instruction device 74 for instructing rotation of the forearm; and a wrist up/down motion instruction device 82 for instructing the up or down motion of the wrist; wherein since a signal reaction generator 2 of the finger operating apparatus described in the first embodiment is fixed at the wrist supporting member 8, various motions of the entire arm from the portions adjacent to the shoulder of the arm of the robot apparatus to the fingertips can be achieved by an operator being seated in, for example, a chair and moving his or her arm with the finger operating apparatus grasped in his or her hand. Therefore, it is possible to easily carry out instruction of the arm motions of the robot apparatus comfortably.

What is claimed is:

1. A finger operating apparatus comprising a finger operating joystick, a signal reaction generator at which one end of the first, second and third return springs are anchored, and the first, second and third wires, one end of each is anchored at said finger operating joystick, and the other ends of which are anchored at the other end of the first, second and third return springs of said signal reaction generator;

wherein said finger operating joystick includes a joystick shaft rotatably attached to said signal reaction generator; a roughly cylindrical body attached onto the upper part of said joystick shaft; a tongue-shaped thumb flexing instruction portion, to which one end of said first wire is attached, rotatably attached to the side of said cylindrical body by pressing of said first return spring; a rectangular projection forefinger flexing instruction portion, to which one end of said second wire is attached, attached at the front upper part of said cylindrical body by pressing of said second return spring so as to freely advance and retreat; and a rectangular projection middle finger flexing instruction portion, to which one end of the third wire is attached, attached at the front lower part of said cylindrical body by pressing of said third return spring so as to freely advance and retreat; and wherein said signal reaction generator includes the first, second and third detectors which detect movements of said first, second and third wires in line with rotation of said thumb flexing instruction portion, the advance and retreat of said forefinger flexing instruction portion, and the advance and retreat of said middle finger flexing instruction portion; and a wrist rotation detector which detects the rotation of said joystick shaft.

2. A finger operating apparatus as set forth in claim 1, wherein said signal reaction generator is provided with a reaction generator, which controls the movement of said first, second and third wires by a braking force responsive to a voltage applied between the other end of said first, second and third return springs and the other end of said first, second and third wires.

3. An arm operating apparatus comprising an arm operating apparatus attaching portion by which said arm operating apparatus is fixed at a fixing portion such as a chair, etc.; an arm forward/backward motion instruction device for instructing the forward or backward motion of the arm; an arm right/left motion instruction device for instructing the right or left motion of said arm; an upper arm rotation instruction device for instructing the rotation of said upper arm; an elbow flexing instruction device for instructing the flexing motion of said elbow; a forearm rotation instruction device for instructing the rotation of the forearm; and a wrist up/down motion instruction device for instructing the up or down motion of said wrist;

wherein a signal reaction generator of the finger operating apparatus as set forth in claim 1 or 2 is fixed at the wrist supporting member incorporating said wrist up/down motion instruction device.

* * * * *